April 2, 1963 W. R. WOOLLEY ETAL 3,083,621
MACHINE FOR LAYING REINFORCING BARS IN CONCRETE PAVEMENT
Filed Aug. 6, 1958 19 Sheets-Sheet 1
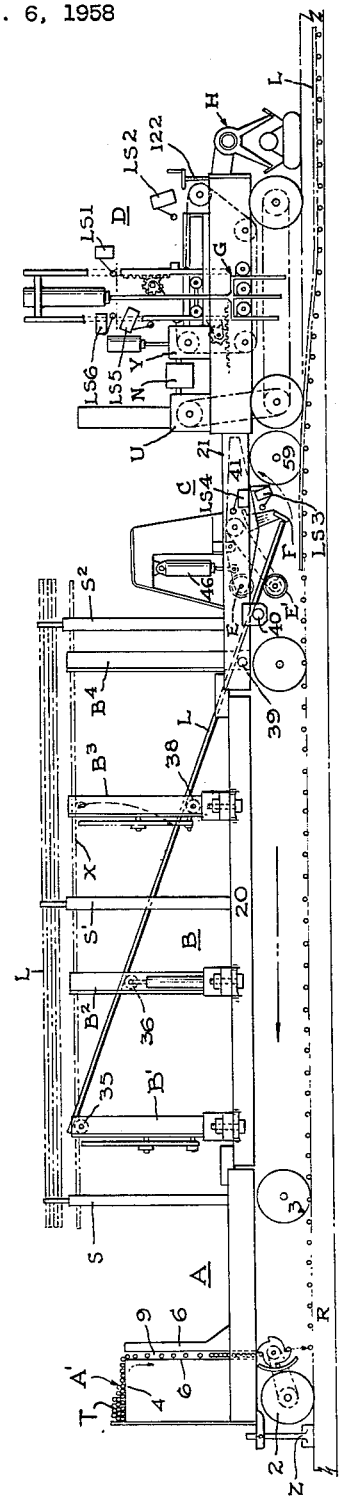
INVENTORS
WAYNE R. WOOLLEY, DECEASED
BY KATHRYN D. WOOLLEY, EXECUTRIX
CARL L. BROWN
BY
ATTORNEY

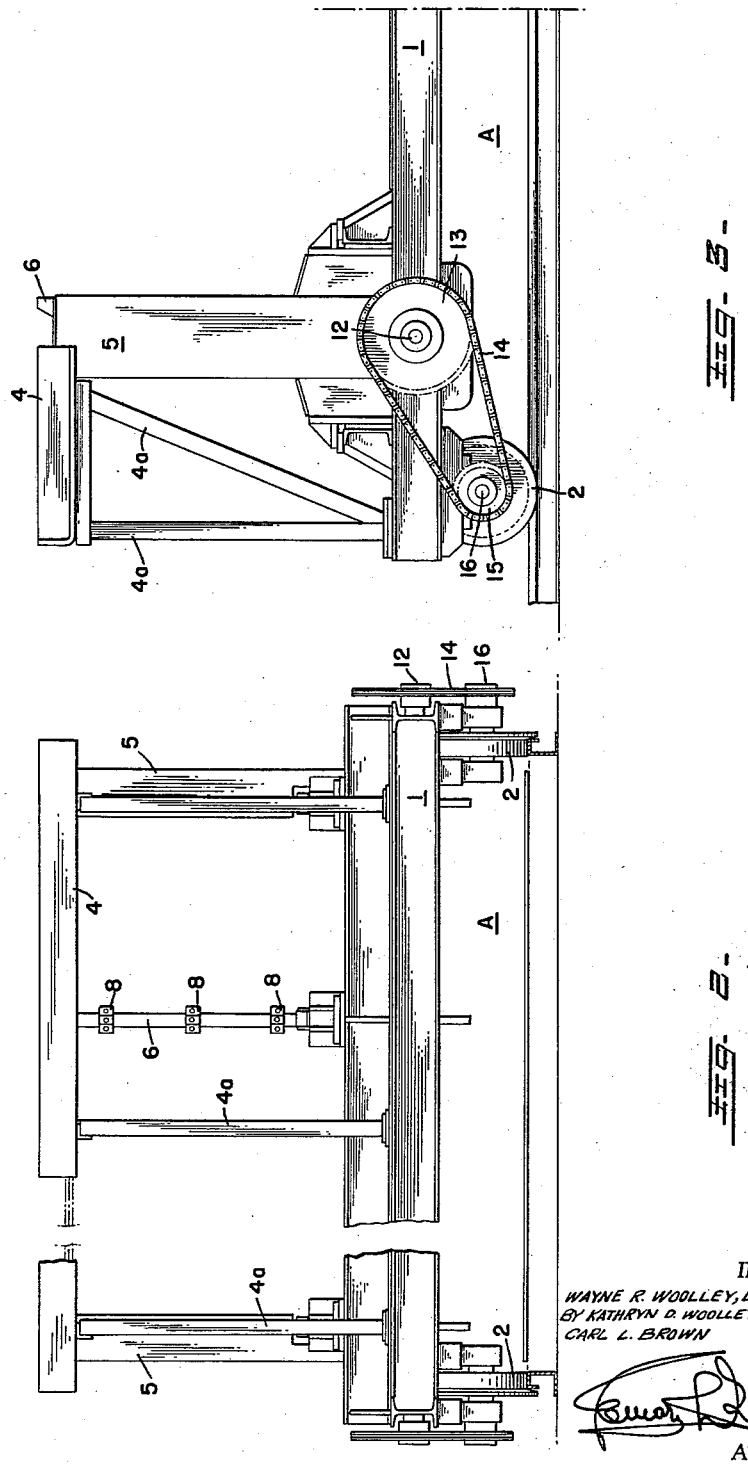

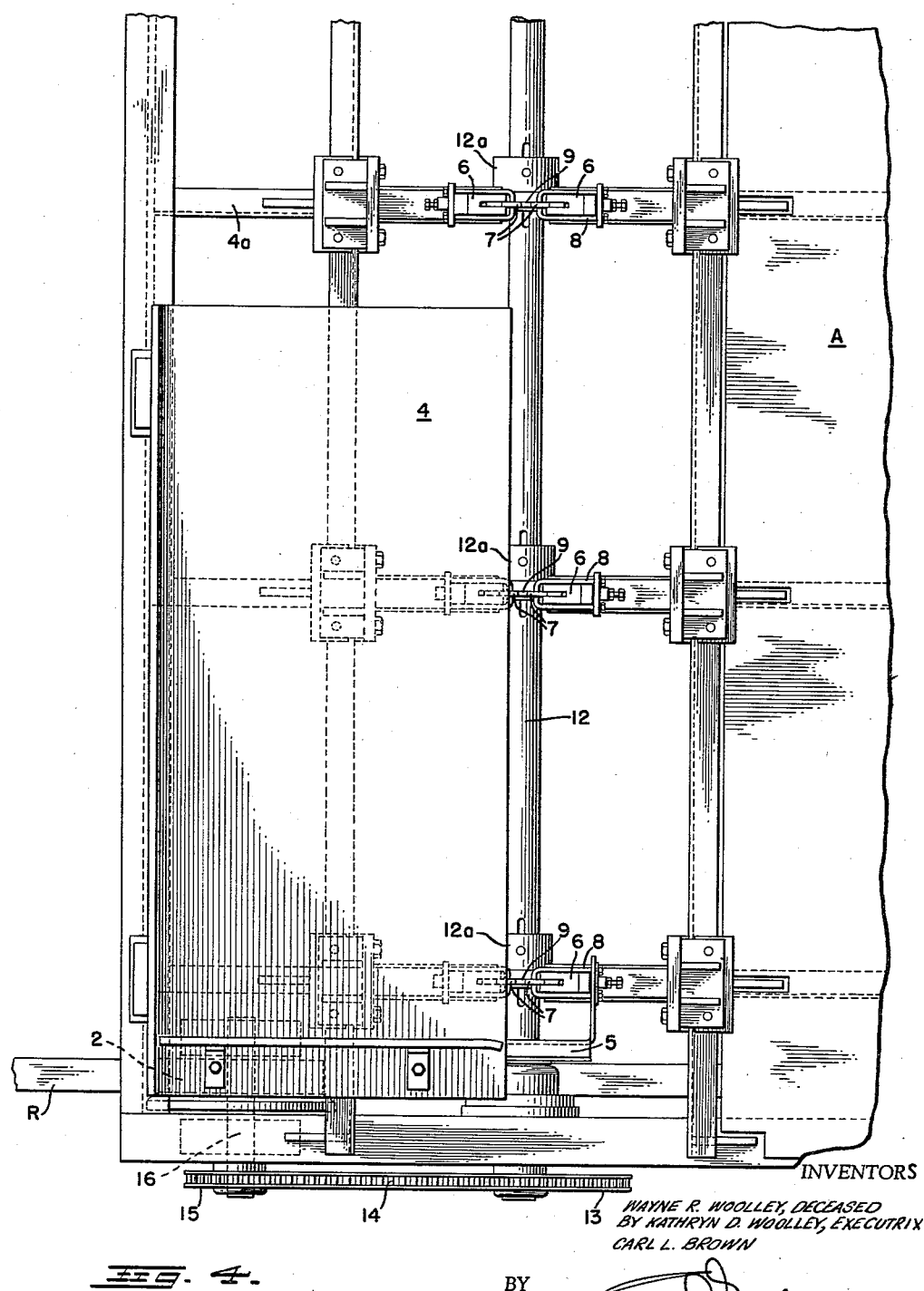

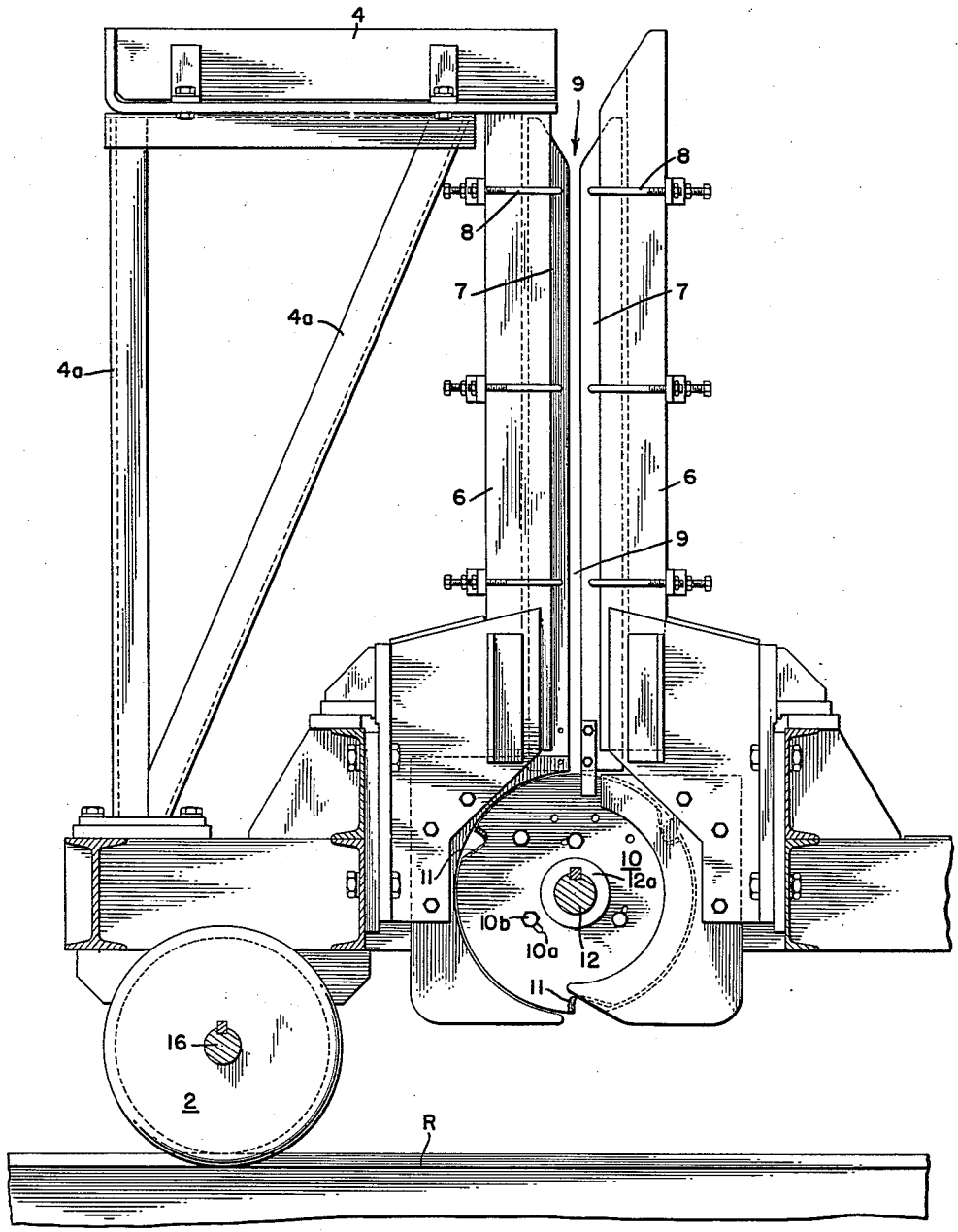

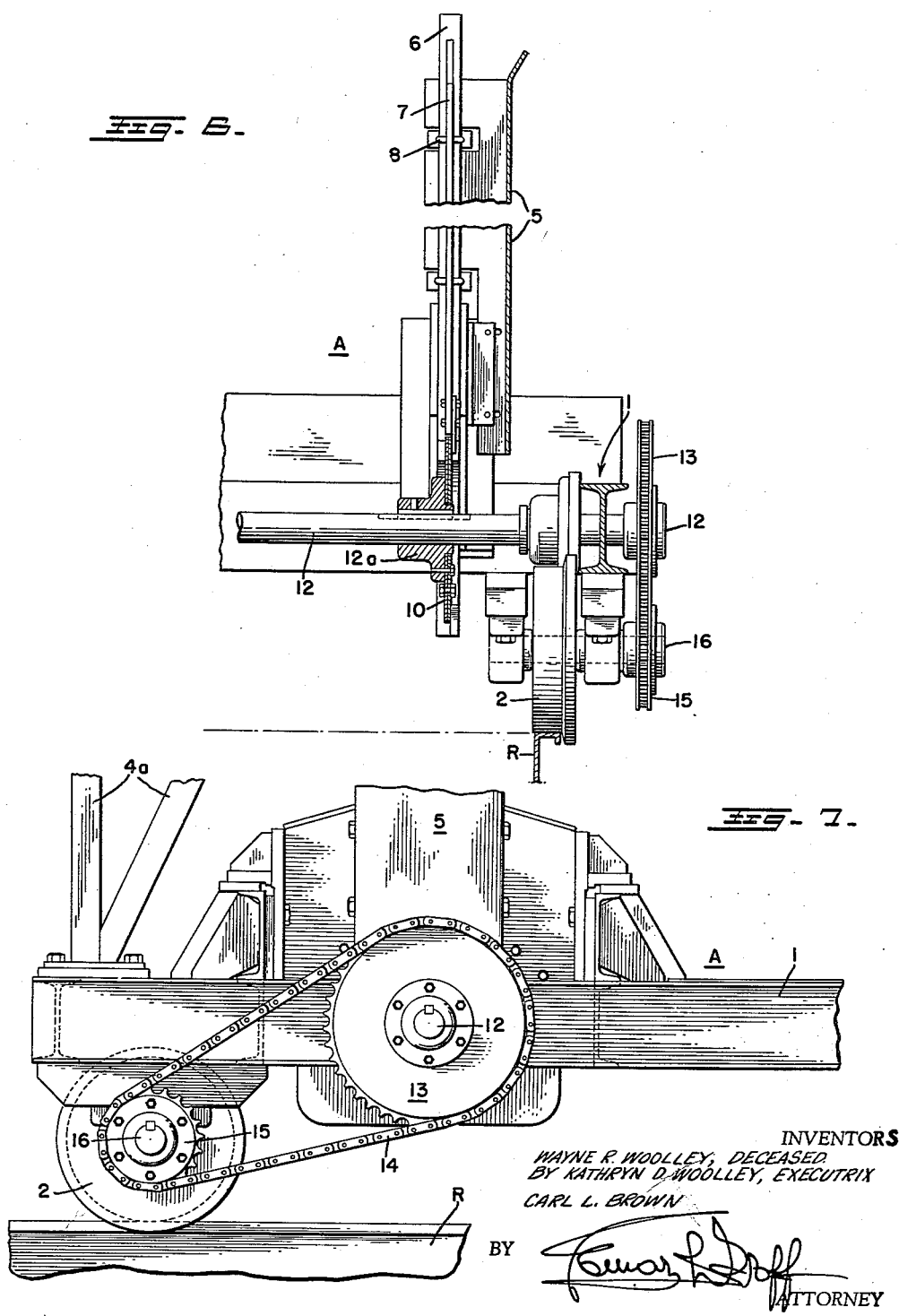

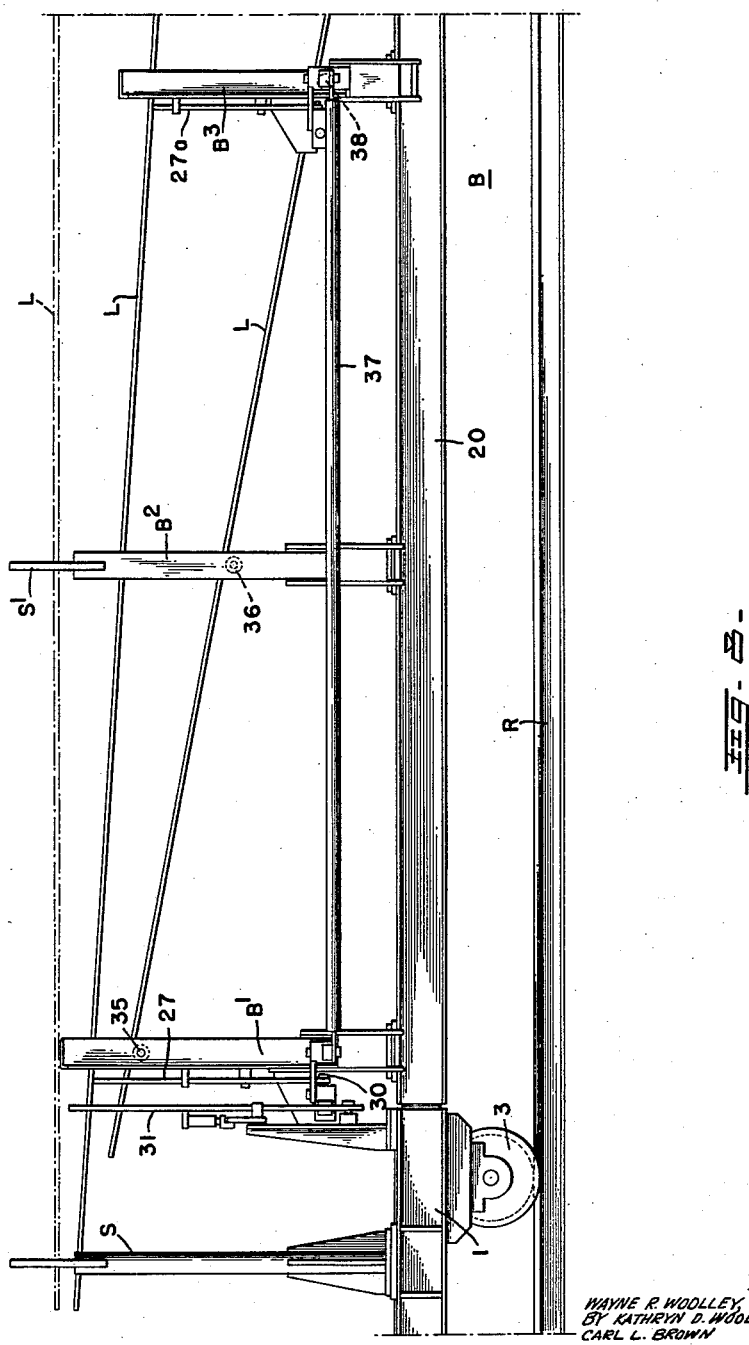

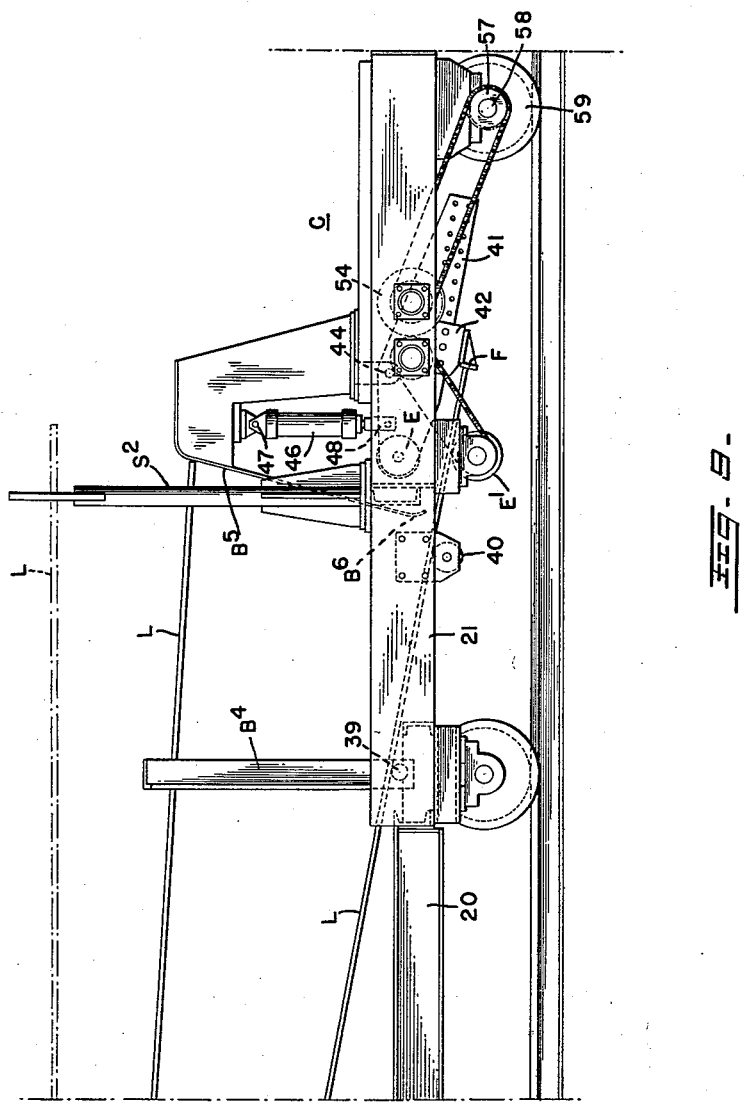

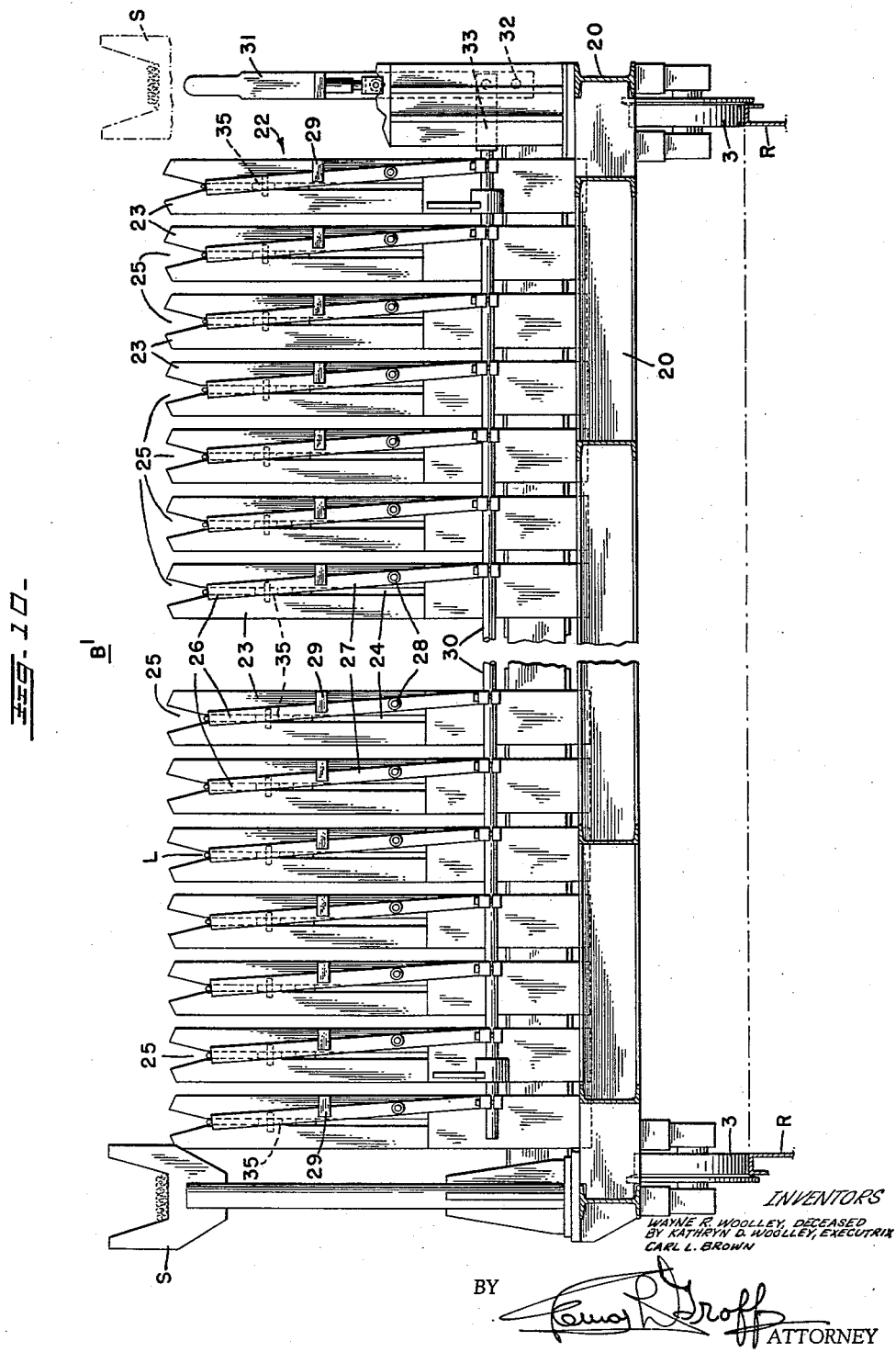

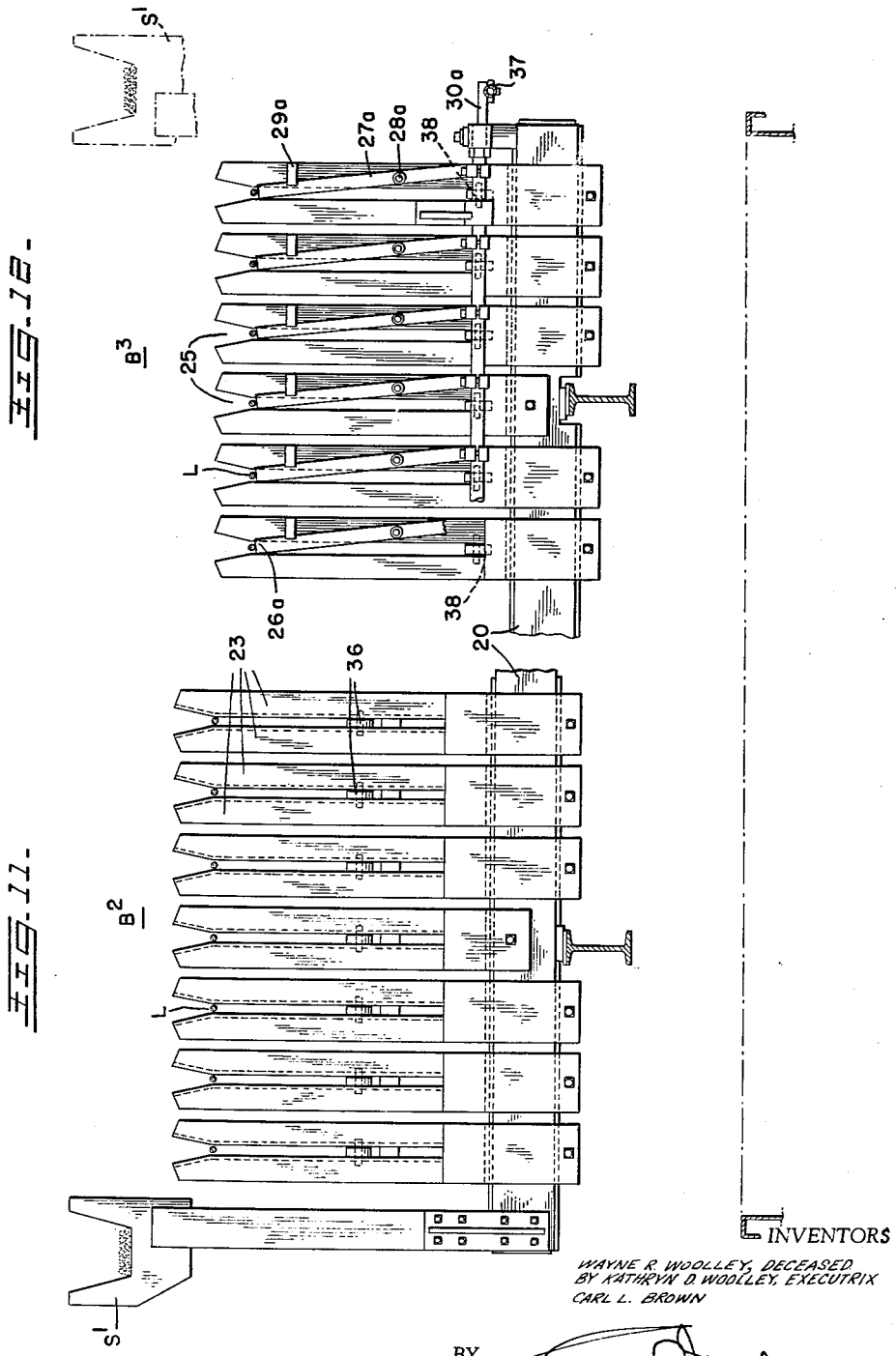

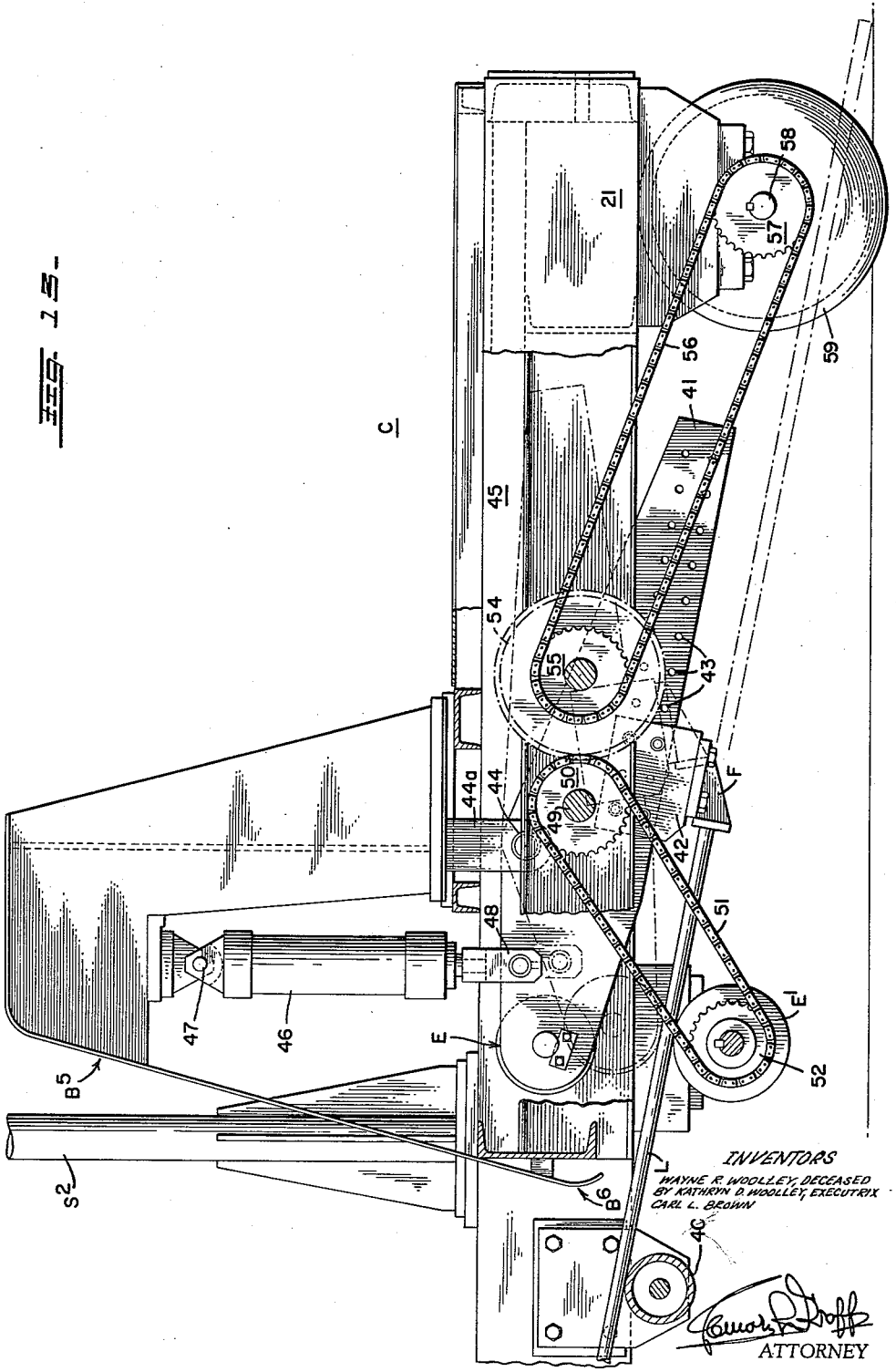

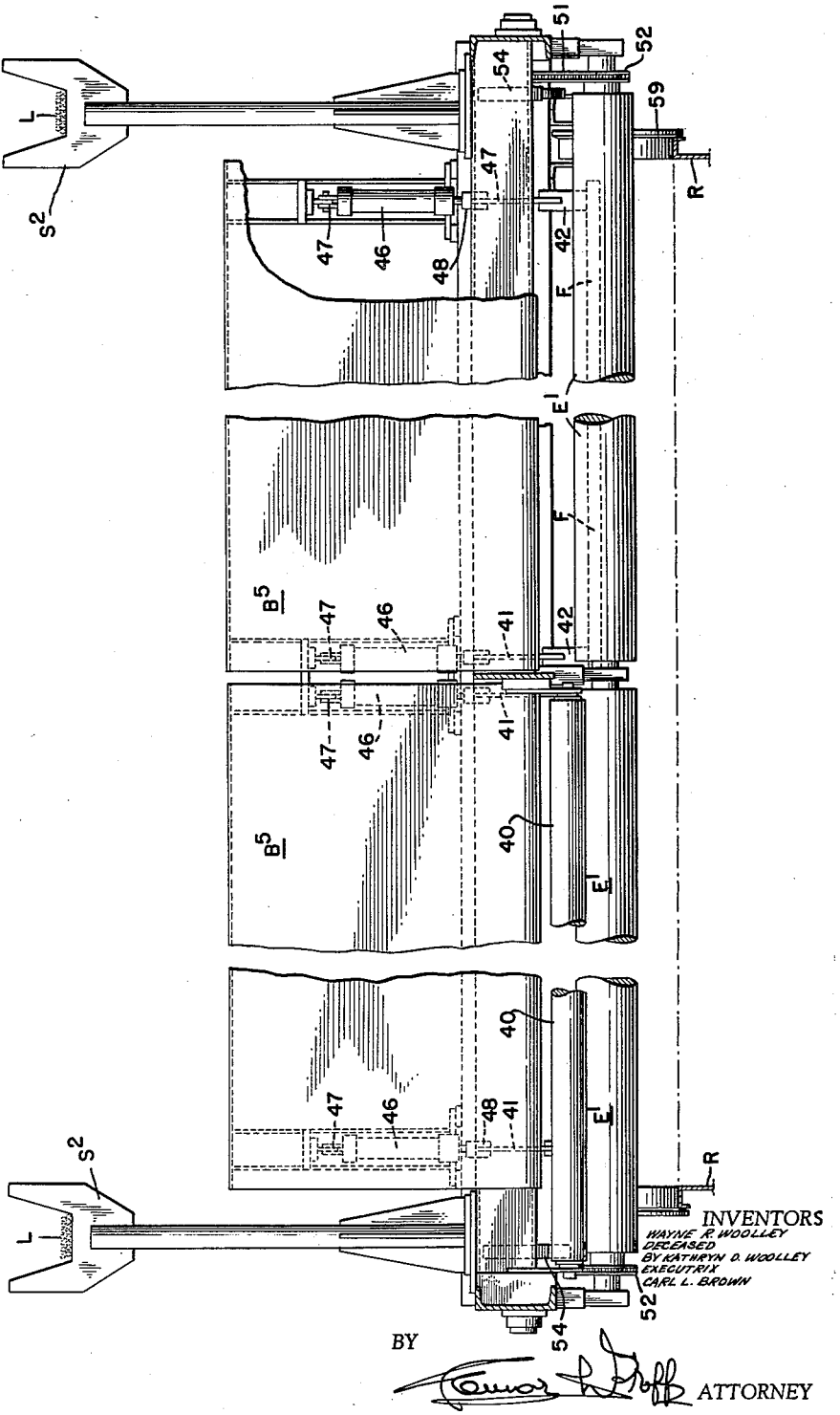

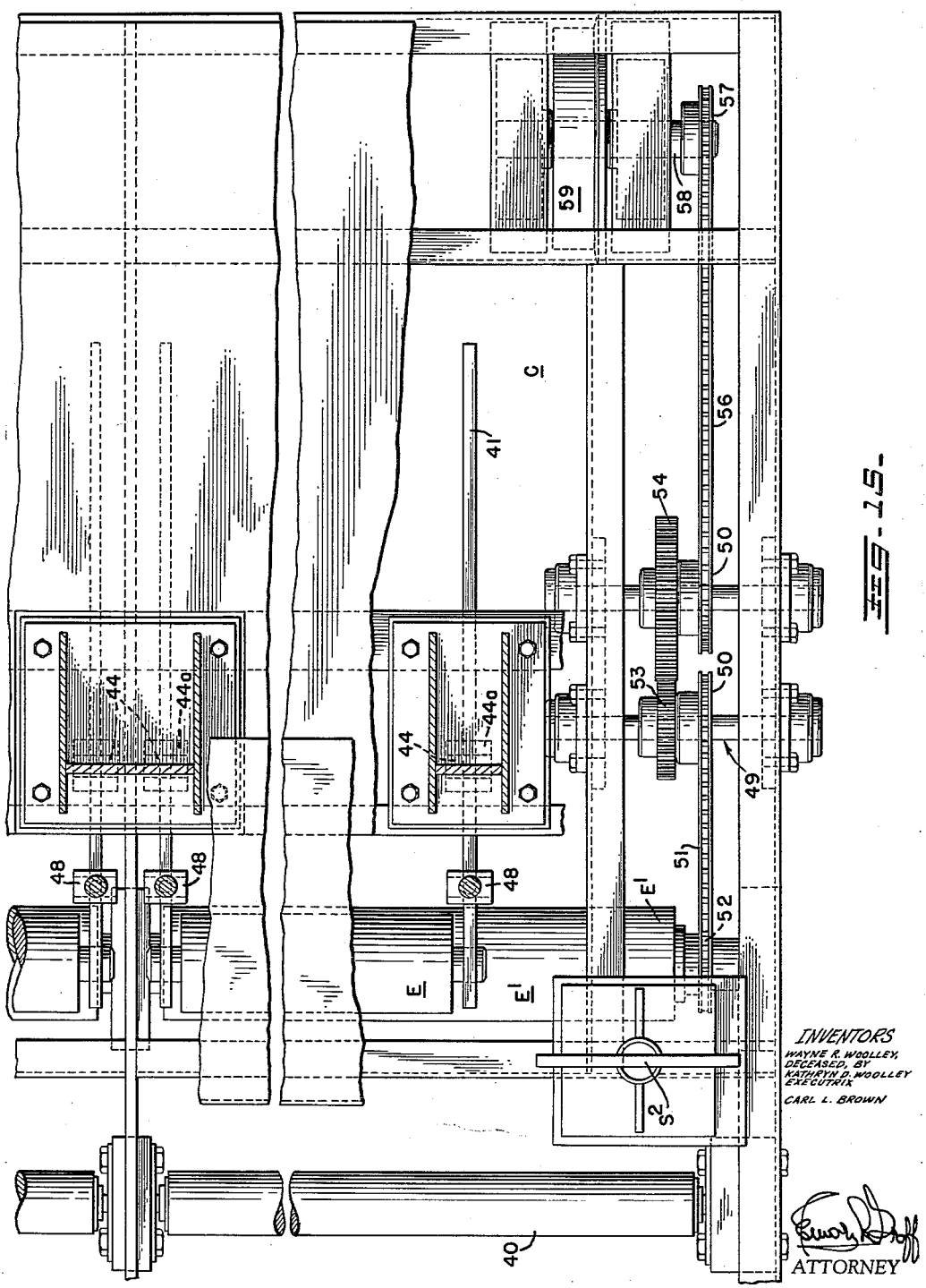

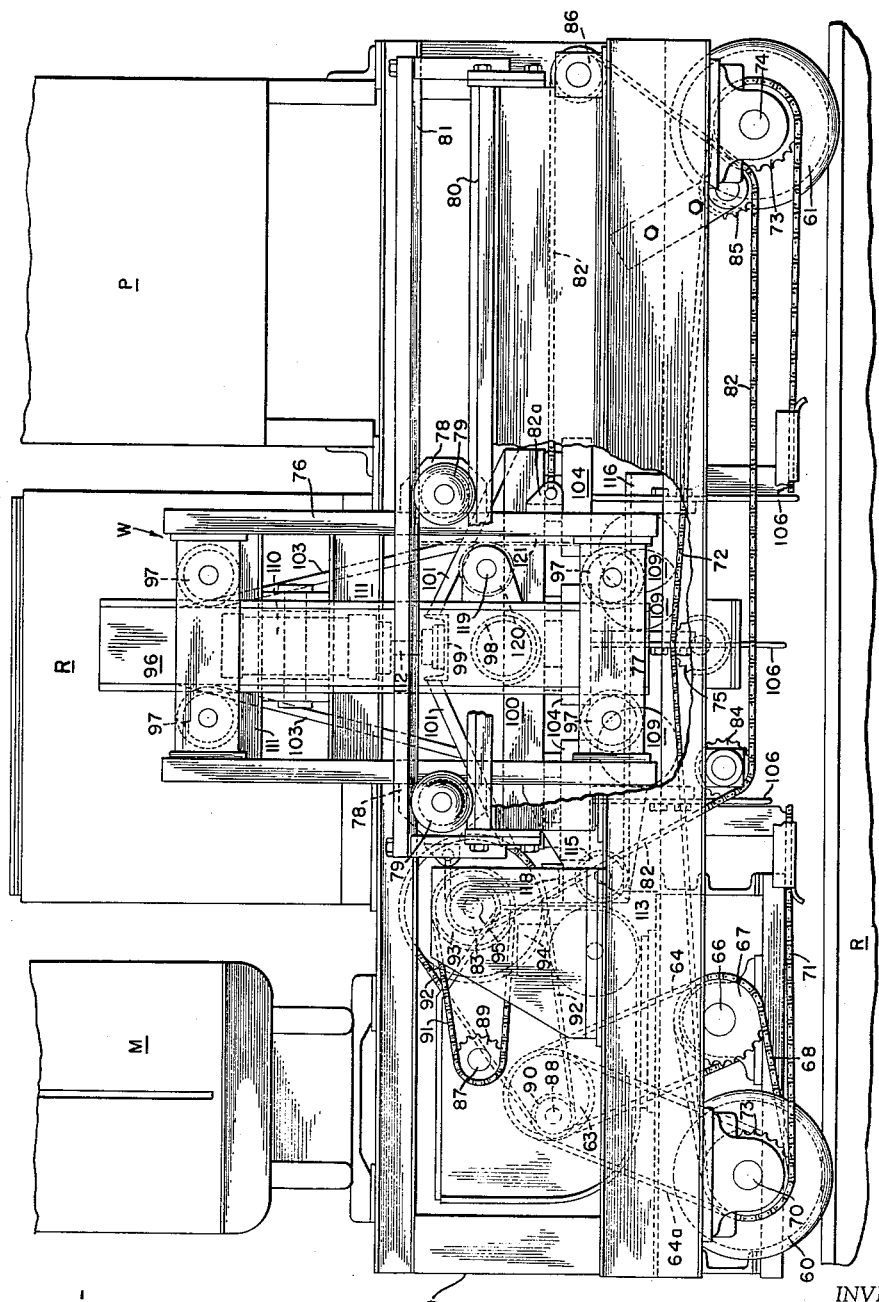

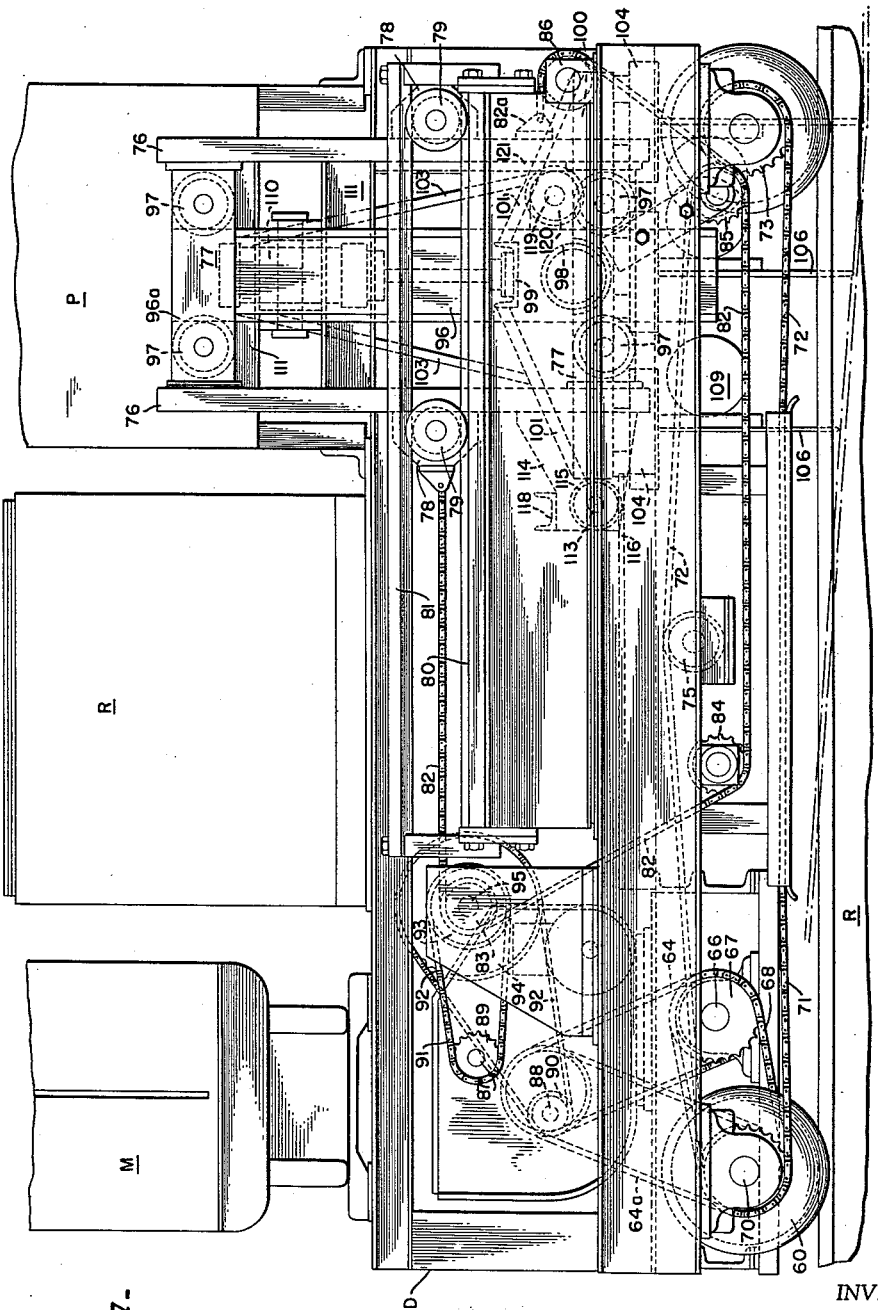

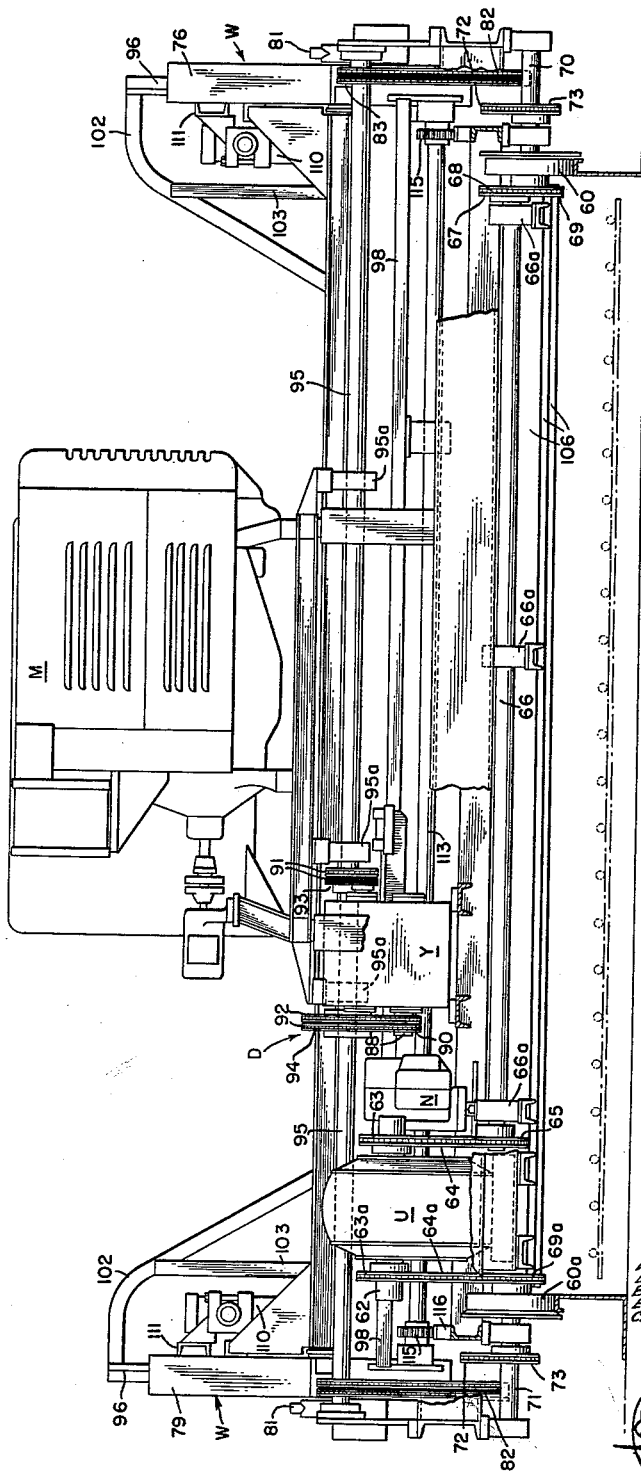

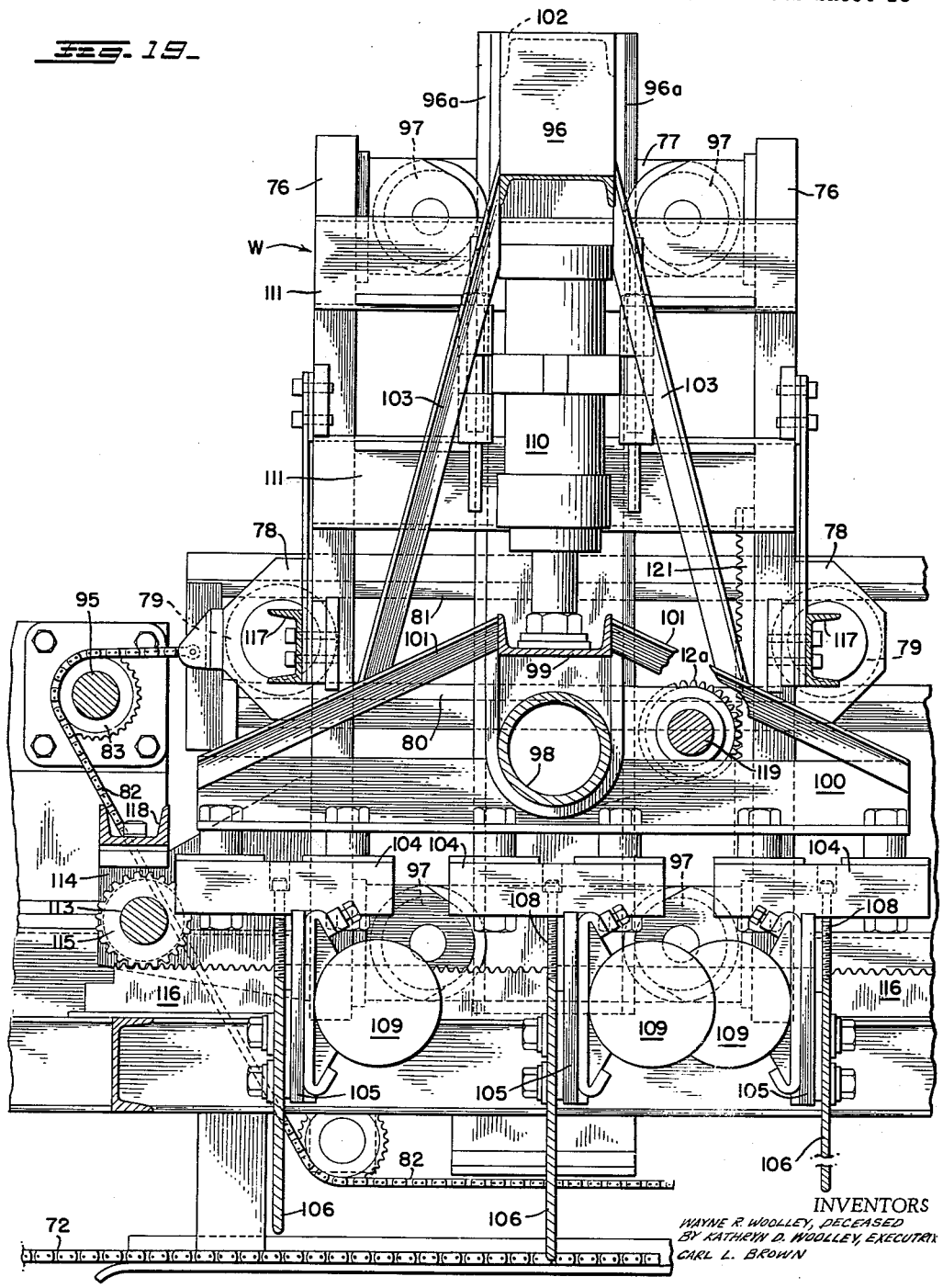

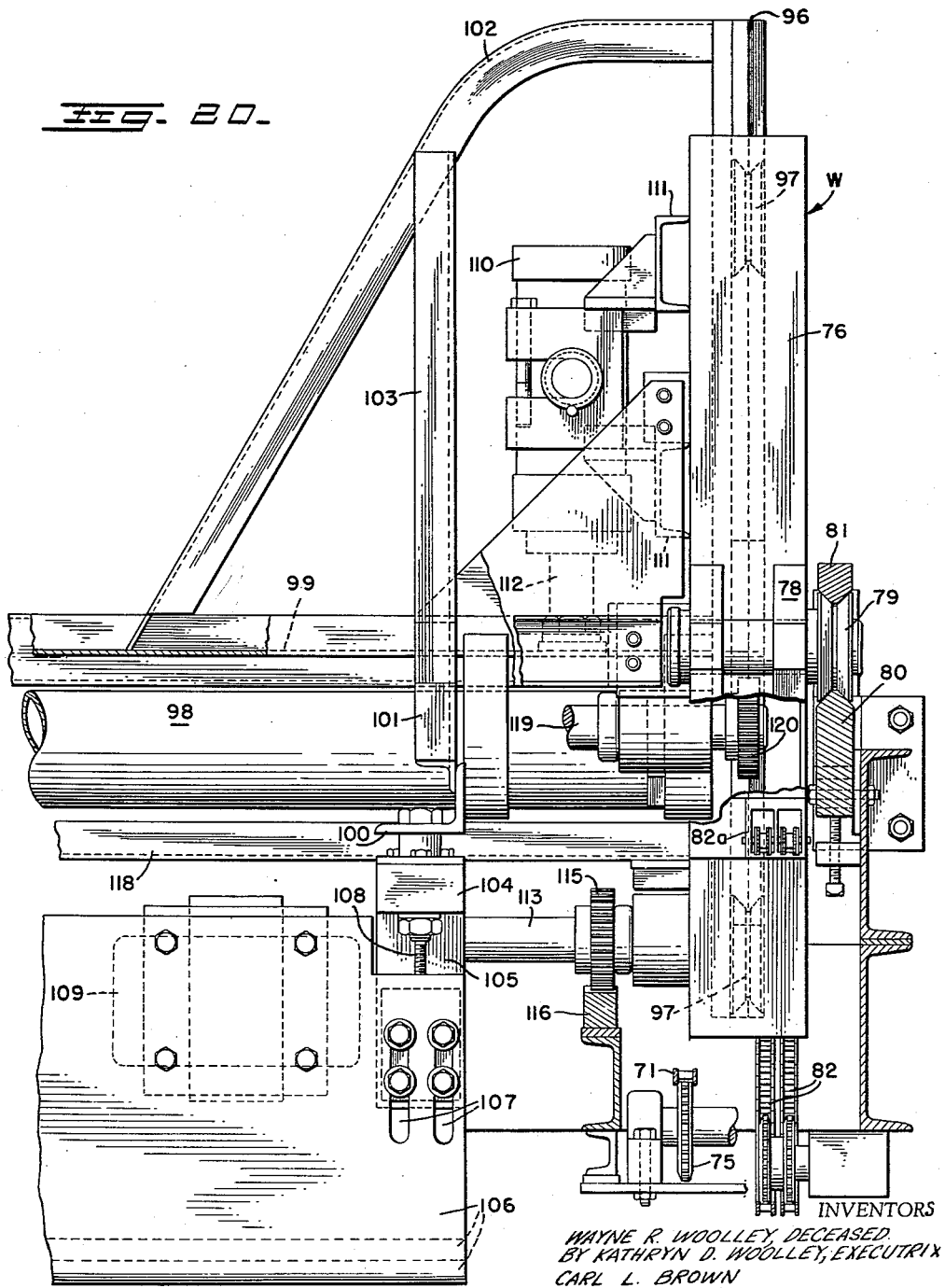

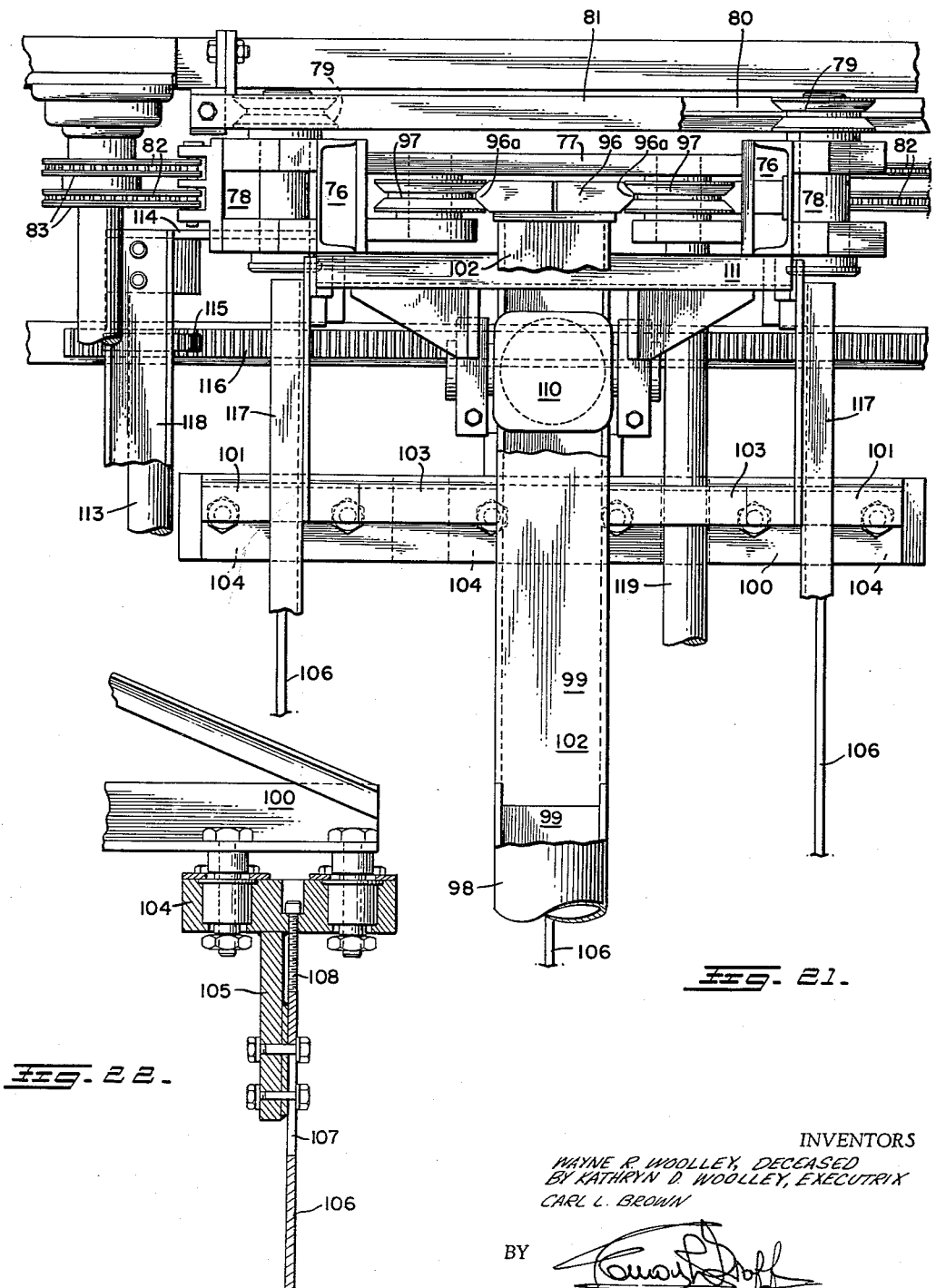

April 2, 1963 W. R. WOOLLEY ETAL 3,083,621
MACHINE FOR LAYING REINFORCING BARS IN CONCRETE PAVEMENT
Filed Aug. 6, 1958 19 Sheets-Sheet 19
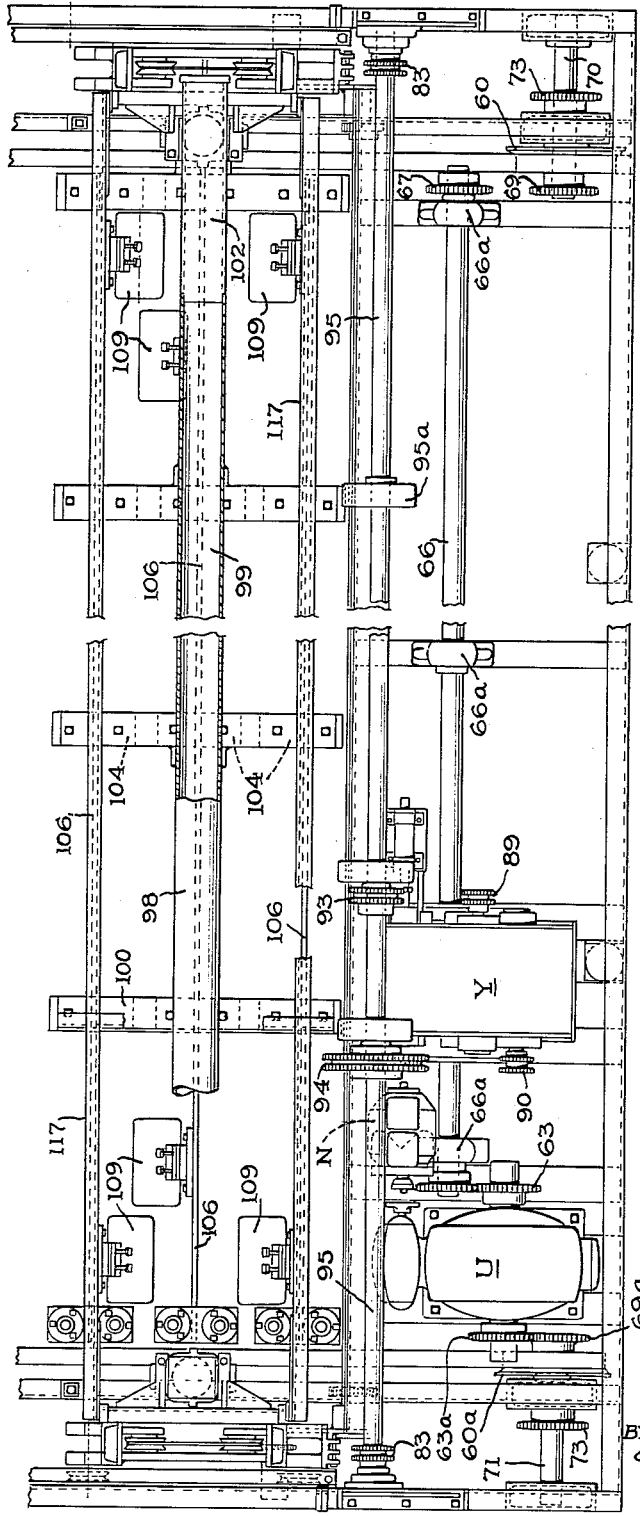
Fig. 23.
INVENTORS
WAYNE R. WOOLLEY, DECEASED.
BY KATHRYN D. WOOLLEY, EXECUTRIX
CARL L. BROWN
BY 
ATTORNEY United States Patent Office 3,083,621
Patented Apr. 2, 1963

3,083,621
MACHINE FOR LAYING REINFORCING BARS IN CONCRETE PAVEMENT
Wayne R. Woolley, deceased, late of Youngstown, Ohio, by Kathryn D. Woolley, executrix, Youngstown, Ohio, and Carl L. Brown, Youngstown, Ohio, assignors to Republic Steel Corporation, a corporation of New Jersey
Filed Aug. 6, 1958, Ser. No. 753,861
16 Claims. (Cl. 94—39)

This invention relates to apparatus for automatically laying reinforcing bars in soft concrete.

Reinforcing steel is normally placed in concrete pavement by one of two methods. In the first and most common method, the steel is formed into welded wire fabric or bar mats. The concrete is struck off at the elevation of the steel; the steel mats are placed by hand and the top layer of concrete is placed and finished. This method requires shop fabrication of mats; shipping mats to the site of the work which presents some difficulty due to the size of the mats; striking off the pavement at two different elevations, laying the steel mats by hand, and finally finishing the pavement. The other method involves the use of steel chairs to support the bars and then hand-tying, in the field, the intersections of the bars. This hand-tying of the steel requires as many as fifteen or twenty men in order to place the steel as fast as the concrete is placed. It will thus be seen that the time, labor and material factors in the operations described are extremely costly.

Accordingly, one of the objects of the invention is to simplify and speed up the progress of laying concrete highways by providing bar laying means which not only eliminate the fabrication and setting up of the reinforcement but reduces the manual operations to a minimum with a consequent saving in time and expense, thereby to make it possible to more completely approach highly desirable automation in concrete road building. For example, in building a roadway under the present invention, the sub-grade of the right of way is prepared, side forms or rails defining the width of the strip are laid; a concrete mixing machine supplied with aggregate and cement proceeds continuously over the rails and discharges its concrete therebetween. A spreader machine usually follows the mixing machine to screed or strike off and level the concrete. Then, the machine of the present invention follows on the rails to substantially continuously deposit the transverse and longitudinal bars and automatically push them to uniform depth in the soft concrete. After the bars have been buried in the concrete, a trailing, tamping or fabricating unit operating on the surface of the concrete heals or covers any scars or furrows that may result from the bar-laying operation, and, at the same time, increases the density of the slab. The surfacing of the roadway is completed by a concrete finishing machine of common construction which follows the machine of the present invention.

Another object of the invention is to provide apparatus comprising a plurality of units whose operation and function are coordinated and synchronized to effect, under manual supervision, the complete automatic transverse and longitudinal bar laying procedures after the bar magazines have been filled or supplied by usual transport facilities.

Another object of the invention is to provide novel means for metering and handling the transverse and longitudinal bar stock in controlled cycles of operation.

A further object is to provide practical and reliable means for pushing or depressing the transverse and longitudinal bars into the soft concrete as the entire apparatus moves progressively forward over the strip of pre-laid soft concrete.

With the above and other objects in view, which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings, in which:

FIGURE 1 is a diagrammatic side elevation of the improved apparatus illustrating the several cars or sections constituting the same.

FIGURE 2 is an elevation of the front end of the apparatus, the same showing the transverse bar laying station of the apparatus.

FIGURE 3 is a partial side elevation of the apparatus shown in FIG. 2.

FIGURE 4 is a partial top plan view of the front portion of the apparatus shown in FIGS. 2 and 3.

FIGURE 5 is an enlarged vertical sectional view of the transverse bar feeding mechanism shown in FIGS. 2, 3, and 4, the line of section being taken at one of the bar feeding slots leading to the related metering wheel.

FIGURE 6 is a detail vertical sectional view of the bar feed and metering means of FIG. 5 taken at an angle of 90° to the axis of the metering shaft of FIG. 5.

FIGURE 7 is an enlarged detail side elevation of the driving means for the metering wheel of the transverse bar laying unit, more clearly illustrating the arrangement of FIGURE 3.

FIGURE 8 is a side elevation of a portion of the station for handling longitudinal bar stock, the lefthand end of FIG. 8 being complementary to FIG. 3.

FIGURE 9 is a side elevation complementary to FIG. 8, illustrating the rear portion of the longitudinal bar feeding means and also showing the bar stock feeding rollers and the bar limiting stop.

FIGURE 10 is a front elevation of the longitudinal bar handling station illustrating the front storage rack for such bars and the front slotted loading stands.

FIGURE 11 is a detail partial front elevation of the middle longitudinal slotted loading stands of FIGURE 8 illustrating the rollers for supporting the intermediate portions of the longitudinal bars.

FIGURE 12 is a detail partial front elevation of the rear loading slots for the longitudinal bars as shown in FIGURE 8 before the bars are released by the latches of FIGURES 10 and 12.

FIGURE 13 is an enlarged side elevation illustrating the pinch rolls and bar stop for the longitudinal bars as they assume their inclined positions when released by the latches cooperating with the slots of the loading stands.

FIGURE 14 is a front elevation, partly in section, of the part of the apparatus including the lower fixed power-driven pinch roll and the rearmost guide roller which together direct the released longitudinal bars by gravity against the bar stop.

FIGURE 15 is a detail enlarged plan view, partly in section, of the drive means for the pinch rolls and illustrating in cross section the stems of the hydraulic cylinders which operate the pinch rolls and bar stop or gate.

FIGURE 16 is an enlarged side elevation of the means for depressing the crossed transverse and longitudinal bars into the concrete, such means being shown with its operating connections in a position such that the bar depressing means itself is elevated.

FIGURE 17 is a view similar to FIG. 16 showing the relative position of parts when the hydraulic bar depressing means is lowered to position to push the bars into the soft concrete.

FIGURE 18 is a front elevation, partly in section, of the power station including a portion of the bar depressing means illustrated in FIGS. 16 and 17.

FIGURE 19 is an enlarged vertical cross-sectional view of the bar depressing unit in its uppermost or retracted position.

FIGURE 20 is an enlarged vertical cross-sectional view of a portion of the bar depressing means shown in FIGURE 19, and illustrating the carriage upon which said means is supported.

FIGURE 21 is a detail plan view, partly in section, of the operating means of the carriage which carries the bar depressing means.

FIGURE 22 is a detail vertical sectional view partly in elevation illustrating the manner of adjustably mounting the blades for depressing the longitudinal and transverse bars into the soft concrete.

FIGURE 23 is a top plan view of that portion of the power station of the apparatus shown in FIGURE 18, omitting the gas engine.

Similar reference characters designate corresponding parts throughout the several figures of the drawings.

General Description

Referring first to FIGURE 1, it will be seen that because of the length of the apparatus, inasmuch as it is intended to handle longitudinally disposed bars of a minimum of 20 feet, it is convenient to construct the same in several cars or sections which, in use, are bolted or otherwise secured together to form a complete operating unit. These connections between cars are such that a slight degree of flexibility is achieved in order to allow the assembled apparatus to negotiate road curves.

For example, the apparatus may comprise the cars designated generally as A, B, C and D.

The car or section A provides an assistant operator's platform, and, in the performance of its primary function serves to receive and hold transverse reinforcing bars T which are manually or otherwise fed from a support designated generally as A′ into suitable guideways leading to metering wheels, as will later appear, said wheels being driven by one of the traction wheels of the apparatus traveling on the forms or rails.

The assistant operator standing on the platform of car A will not only supervise the feeding of transverse bars, but can also assist in placing the longitudinal bars L carried by the side storage racks of car B in position to be conveyed for deposit on the transverse bars, both of which are simultaneously pushed into the soft concrete.

The rear of car A, the middle of car B and the forward portion of car C are provided with bulk bar storage racks S, S′ and S², intended to receive the longitudinal bars in bundles from the transport facility. It will be understood that the bar supports S, S′ and S² are provided along both sides of cars A, B and C to minimize the operator's time and walking required to load the longitudinal bars in the loading stands.

The car B is provided with a plurality of loading stands designated B¹, B² and B³ and each having the transversely disposed series of bar guides. (FIGS. 8–12). Also, the car C at a point adjacent the car B is provided with a longitudinal bar loading stand B⁴.

Dealing further with the car B, it will be seen that it spans the distance between cars A and C to which it is bolted and has no supporting wheels. Also, it may be pointed out here, and later in more detail, that the assistant operator and the control operator standing on the platform of car C may lift individual bars from the storage racks S, S′, S², and place them in the upper ends of the slotted guides B¹, B², B³ and B⁴.

The bars are held in loading position by a plurality of manually controlled supports in the nature of latches. When said latches are released the longitudinal bars will fall to the inclined position (full lines) of FIGURE 1, and, with the aid of rollers on the loading stands the bars L will gravitate downwardly between pinch rolls E and E′ until they strike the bar gate F.

The operation is such that when the upper pinch roll presses the bars against the power driven lower pinch roll, the bar gate will be raised clear of the bars and the pinch rolls will pull all of the bars into position to overlie the transverse bars.

The car D carries suitable motors for driving the entire apparatus and also carries the bar depressing means designated generally as G.

The over all operation for purposes of pointing out more in detail the structure and function of the several units may be briefly described to an advantage at this point.

For example, the assistant operator standing on the platform of car A loads bars from the transverse storage rack A′ into the loading slot, and the assistant operator standing on car A and the control operator standing on the platform of car C take the longitudinal bars L from the storage position S, S′ and S² and place them in the flared mouths of slots of the bar loading stands.

The operator on the platform of car A or C trips a hand-operated bar release lever dropping the longitudinal bars from the horizontal position shown at x in FIG. 1 to an inclined position where the bars are supported by rollers on the roll stands. The longitudinal bars are thus gravity fed to the bar gate F.

The control operator on the platform of car C turns to the control station and pushes the automatic cycle control button to set the bar laying means G automatically into operation. The upper pinch roll E swings down and pinches the longitudinal bars between the rolls E and E′ and lifts the stop gate F. The gate F during its movement trips a suitable limit switch (LS³) to start the motor M to propel the entire apparatus forward. At the same time the carriage for the bar depressing member G is started on its backward stroke and the blades of the bar depressing unit G begin their downstroke and at the same time start the surface vibrator H in operation.

As the apparatus moves forward the transverse bars are dropped from car A and the longitudinal bars are dropped on top of the transverse bars so that the blades of the bar depressing member G start pushing the assembled bar structure below surface of the concrete to the desired depth.

When the blades of the member G reach the bottom of their stroke, a limit switch (LS²) is closed causing the pusher blades to move up out of the concrete, and the carriage on which the unit G is mounted, continues to move on toward the rear of car D and closes the limit switch (LS¹) to activate the clutch cylinder D′. The clutch reverses the carriage drive, rapidly moving the carriage to the front of car D, and, as the carriage reaches its forward position, it opens limit switch (LS⁵) activating clutch D², moving the carriage for unit G to the rear of the car again. The limit switch (LS⁵) is again opened and causes the pusher blades of the unit G to move down again, reenacting the entire cycle.

The carriage for the depressing means G keeps cycling until the longitudinal bars are completely payed out causing limit switch (LS⁴) to open simultaneously, stopping the forward motion, the carriage and blade motion, shutting off vibrating motor and causing the upper pinch rolls E to rise and dropping the gate F into position to receive the next load of longitudinal bars.

The rail engaging wheels of the apparatus are driven through suitable reduction gearing and speed regulator so that the forward rate of travel may be controlled from 0 to 15 feet per minute.

At the outset it may be pointed out that all of the cars or sections A, B, C and D include suitable framework composed of standard structural shapes journalled upon rail engaging traction wheels for forward movement responsive to the power supplied by motorized rear unit D.

Transverse Bar Operation

The car A includes a suitable framework designated generally as 1 mounted upon the front traction wheels 2 and the rear wheels 3, the latter being idlers in the respect that they merely provide rolling supports. As will be observed more particularly from FIGURES 2 and 3, the upper forward portion of the frame 1 is provided with a transverse bar storage tray 4 supported by framework 4ª, said tray communicating with a front loading stand including side plates 5 and a series of aligned uprights 6, which carry at their facing edges suitable vertically disposed guide members 7 secured by clamps 8 to the uprights 6 in such a manner as to provide a longitudinal bar slot 9 as will be seen more especially from FIGURES 2, 3, 4 and 5.

As will appear more distinctly from FIGURE 5, the slots 9 of the uprights 6 communicate with related two part metering wheels 10 provided with bar seats or notches 11 countersunk within the peripheries thereof, said seats adapted to register with the bottom of the slots 9 to receive and carry a transverse bar from the lower end of the slot 9 to a position to be dropped onto the soft concrete. It will be understood that each metering wheel 10 includes a pair of discs provided with concenric slots 10ª through which bolts 10ᵇ pass to secure the discs together and also to permit relative angular movement therebetween for adjusting the size of the seats 11 to accommodate the various diameters of bars used. Each pair of discs constituting a metering wheel are fastened to a hub 12ª and said hubs are in turn keyed to a common shaft 12 which extends beyond both sides of the frame 1 to receive a sprocket gear 13. This sprocket wheel is interchangeable with wheels having more or less teeth which will change the rate of rotation of the metering wheels 10 to alter the relative spacing of the transverse bars as they are laid.

The sprocket 13 is engaged by a chain 14 (FIGS. 4 and 7) which in turn is sheaved over a sprocket 15 keyed to the axles 16 at the front wheel 2 of the car A. It will thus be seen that as the entire apparatus is propelled over the forms or rails R, the shaft 12 will be driven to remove bars from the lower end of slot 9 and deposit them at regular spaced intervals across the roadway.

First Stage of Longitudinal Bar Operation

The longitudinal bar laying operation is carried out jointly by the cars or sections B and C as will be apparent from the diagrammatic view, FIG. 1.

Reference will now be made more in detail to this phase of the apparatus which is illustrated in FIGURES 8–15 inclusive.

As will be observed from FIGURES 1, 8, 9, 10 and 11, the rear of car A, the middle of car B and the forward portion of car C are provided with the bar storage racks S, S¹ and S². From FIGURES 10, 11 and 12, it will be seen that these storage racks are disposed at the outer sides of the frame 1 of the car A, the frame 20 of the car B and the frame 21 of the car C (FIG. 3) so that they may readily receive bundles of longitudinal rods which may be loaded by hand into the storage racks or supplied by a crane from transport trucks which are intended to move alongside of the present apparatus.

The longitudinal bars L are lifted from their storage position indicated by dotted lines in FIGURES 8, 9 and 10 and placed at the upper ends of a series of loading stands B¹, B², B³ and B⁴. The number of these loading stands may be varied according to the size of the longitudinal bars being used. Each of these loading stands is provided with paired upright members forming slots therebetween.

As the lateral spacing of the longitudinal bars will vary according to the contract specifications between each roadbuilding job, it will be understood that the loading stands may be altered by adding or removing one or more paired upright members from each loading stand and by laterally readjusting the upright members on their supporting frame 20.

Referring to FIGURE 10, the paired upright guide members 23 of the stands B¹ are spaced to provide slots 24 having a flared mouth portion 25. Where the flared mouth portion 25 joins with the slots 24, are located the upper ends 26 of a plurality of holding and release levers 27, pivoted as at 28 so that when the control lever 31 is in a vertical position as shown in FIG. 10, the upper ends of said release levers will be held in obstructing relation to the upper feeding ends of the slots 24. The lower ends of these levers are connected by a common actuating rod 30 journalled at each side of the loading stands for axial movement upon the manual shifting of the lever 31 pivoted at 32 to a portion of the frame 20. When the handle of the lever 31 is moved toward the loading stands, the link 33 will move the shaft 30 to the left, as viewed in FIGURE 10, and thus the release levers 27 will be rocked against the stops 29 to clear the slot entrances and permit the longitudinal rods L to drop onto the rollers 35, 36, 38, 39, 40.

It should be noted that a duplicate control lever similar to lever 31 could be mounted on car C and connected by an extension shaft to shaft 37 so that it would be possible for the operator at the control station in car C to release the longitudinal bars.

As will presently appear in more detail, the rollers 35 are in bar stand B¹; the rollers 36 are in bar stand B²; the rollers 38 are in stand B³; and the rollers 39 and 40 are respectively on stand B⁴ and suspended from the bottom of car C.

The second stand B² shown in FIGURES 8 and 11 does not require bar release levers, but, as shown by dotted lines in FIGURE 8 and full lines in FIGURE 11, the upright guide members 23 are provided with rollers 36 at a lower elevation that the rollers 35 of the stand B¹.

The third loading stand B³ is of the same construction as the front loading stand B¹ shown in FIGURE 10 and includes similar bar holding and release levers 27ª pivoted at 28ª and connected to a common operator rod 30ª which in turn is connected by shaft 37 (FIG. 8) with the manual operating lever 31 so that all of the longitudinal bar release levers 27 and 27ª are simultaneously operated to permit bars L to drop from the tops of the levers into the feeding slots of the respective stands and onto the rollers of each stand. The rollers 38 of stand B³ is disposed at a lower location that the roller 36.

Also the bar stand B⁴ of car C is provided with slots in the same fashion as the slots of the second roll stand B⁴. At the lower ends of the slots in the roll stand B⁴ are provided rollers 39 and on the frame 21 of the car C to the rear of rollers 39 are provided a final bar supporting rolls 40.

When the operators remove the longitudinal bars L from the storage racks S, S¹, and S², and place them in position x (FIG. 1), the rear ends of the bars are placed in abutting relation with the inclined abutment wall B⁵ (FIG. 13) which extends transversely across the frame of the car C and has its lower end B⁶ curved rearwardly to assist in directing the downwardly descending bars L onto the rollers 40 preliminary to engagement with the pinch rolls E and E'. This abutment wall assures the descending longitudinal bars being properly position as they move downwardly and insures accuracy of axial movement towards the gate F.

It will thus be seen that the rollers 35, 36 and 38, 39 and 40, are disposed so that, looking at FIGURES 8 and 9, the uppermost bar L shown in full lines is supported by the upper ends of the release levers 27 and 27ª until the lowermost bar, in full lines, has been completely drawn through the pinch rolls E and E', whereupon the operator will actuate the release levers 27 and 27ª allowing the longitudinal bars resting thereon to drop onto the rollers 35, 36, 38, 39, 40. The bars then roll downwardly by gravity until they hit the bar stop F.

Second Stage of Longitudinal Bar Laying Operation

The above description, bringing the longitudinal bars into engagement with the gate F, as previously indicated begins the bar laying cycle in the respect that the entire forward motion of the apparatus starts, and in proper sequence the carriage for the bar depressing unit G begins and the depressing blades begin to start their downstroke.

Simultaneously with the above sequence, the upper pinch roll E is moved from the full line position of FIGURE 3 to clamp the bar L while the gate F is elevated so that the bars L may be moved to the dotted line position of FIGURE 13 due to the rotation of the fixed pinch roll E'.

The stock gate F is adjustably mounted on the four levers 41, as shown in FIGS. 13 and 14. As will be seen from FIG. 13, the gate F is provided with an attaching plate 42 adapted to selectively receive bolts or equivalent fastenings intended to fit in the openings 43 of the lever. The levers 41 are pivoted about shaft 44, mounted in brackets 44a suspended from the deck of the car C, the said lever carrying the movable pinch roll E at its forward end. These levers are rocked about the pivot axis 44 by fluid cylinder controlling device 46, the said device having one end fixed to the frame of the car C as indicated at 47 and its lower end connected by the clevis 48 with the forward end of the lever. When the forward end of the lever 41 is pushed downwardly by the piston of the fluid cylinder 46, it will be seen that the bar L is gripped between the rolls E and E'.

The shaft 49 is provided with a sprocket 50 which in turn carries chain 51 sheaved about the sprocket 52 of the lower fixed pinch roll E'. Therefore, since the shafts 49 is power driven as will presently appear, it will be seen that the fixed pinch roll E' will be rotated to positively feed the bars L gripped between it and the upper pinch roll E so as to pull it completely out of the bar stands and drop it on to the soft concrete.

The shaft 49 as shown in FIGURE 15 is provided with a gear 53 which in turn meshes gear 54 driven by the sprocket 55 the chain 56 which latter is sheaved about the power driven sprocket 57 mounted on axle 58, upon which the traction wheels 59 are mounted. Thus, as the car C is pushed along by car D which is the source of motive power for the apparatus, the longitudinal bar control means will be synchronized with the movement of the transverse bar-laying mechanism of car A and the bar depressing mechanism G of car D.

The holes 43 in levers 41 allow for adjustable positioning of stop gate F. The location of said gate determines the length of longitudinal bars L that will pass over pinch roll E' before said bars abut against the stop gate. This length will determine the degree of overlay between the ends of succeeding sets of payed out longitudinal bars. This overlay is necessary to insure the adequate reinforcement in the roadway between the extremities of each set of longitudinal bars. An adjustment of this overlay is provided, since the reinforcement requirements will vary between road-building jobs, due to the various sizes of bars used. As soon as the trailing ends of a set of bars L pass through rolls E, E'; the following occurs:

(1) Said ends of bars L drop upon the roadway and automatically stop forward motion of machine.

(2) Levers 41 automatically pivot to open pinch rolls E, E' and lower stop gate F.

(3) A new set of longitudinal bars L are dropped upon rollers 35, 36, 38, 39 and 40 and proceed to abut against stop gate F.

These three movements are accomplished within seconds, therefore, requiring only a moment's delay in the forward movement of the machine. As most clearly illustrated in FIGURES 1 and 13, any rearward adjustment of stop gate F would increase the length of bars L that would overlay the previously laid set of longitudinal bars (FIGURE 1).

Third Stage of Longitudinal Bar Laying Operation

The third stage of bar laying operation is effected by mechanism mounted on car D.

As previously indicated, this car carries the bar depressing means designated generally as G.

Reference will now be made more in detail to this phase of the apparatus which is illustrated in FIGURES 16–22 inclusive.

The power train of car D which in turn pushes the other cars of the invention is best disclosed in FIG. 18. Gasoline engine M mounted at the front of car D furnishes the power for operating an hydraulic drive-motor N. Said hydraulic motor is equipped with double shaft extensions (not shown) which in turn supply power to a transmission Y and a speed reducer U. Said reducer transmits the power for driving car wheels 60 and 60a as will presently be disclosed.

Speed reducer U is equipped with a double output shaft extension 62 having equal size sprocket wheels 63 and 63a mounted upon each end. Sheaved about said sprockets 63 and 63a are chains 64 and 64a. Chain 64 is further sheaved about sprocket wheel 65 which is fixed about shaft 66. This shaft 66 is supported by bearing members 66a and extends to the opposite side of the car where sprocket wheel 67 is mounted upon its extremity (FIGS. 16, 17 and 18). Sheaved about sprocket wheel 67 is chain 68 which in turn engages sprocket wheel 69. Said sprocket wheel 69 is fixed upon axle 70 of wheel 60.

Chain 64a previously referred to, engages sprocket wheel 69a which is fixed upon axle 71 of wheel 60a. It will thus be seen that rotation of output shaft 62 of speed reducer U will transmit tractive power to the two forward wheels 60 and 60a of car D.

To obtain maximum traction between car D and rails R, forward drive wheels 60 and 60a are each connected to rear wheels 61 by means of a chain 72 which is sheaved about sprocket wheels 73 mounted upon axles 70, 71 and 74. In this manner a positive 4-wheel drive is imparted to car D. In order to maintain correct tension of chains 72, they are supported by sprocket wheels 75 (FIGS. 16, 17 and 20) located midway between the front and rear wheels of the car.

The primary function of car D concerns the operation of the bar depressing means previously designated generally as G.

Said means consists of hydraulic stands W comprising upright channels 76 and horizontal braces 77. Mounted on said vertical channels are brackets 78 which support V-grooved rollers 79. Said V-rollers ride between inverted V-ways 80 and 81 which are bolted to the frame of car D.

Attached to the front brackets 78 are double sprocket chains 82 which pass over double sprocket wheels 83, 84, 85, and 86. The other ends of chains 82 are attached as at 82a to the rear upright channels 76. Thus it will be seen that if one of said sprocket wheels were to be connected to a power source, as will presently be described, then hydraulic stands W would be moved along inverted V-ways 80.

In operating the bar depressing unit the hydraulic stand W moves rearwardly at exactly the same pace as the car is moving in relation to the pavement with the result that the pusher blades are in a stationary position with respect to the concrete. When stand W has reached its rearward limit, it is returned forward at a much faster rate. The power for operating said hydraulic stand is obtained from a two-speed, two-direction, clutch-controlled transmission Y which is energized by previously disclosed hydraulic drive motor M. Said transmission Y is provided with two output shafts 87, 88 having sprocket wheels 89 and 90 respectively. Said sprocket wheels are connected by double chains 91 and 92 to sprocket wheels 93 and 94 respectively, which are mounted upon a common shaft 95. Said shaft 95 is supported for rotation by bearing members 95a and has sprockets 83 attached at its extremities.

It will thus be seen that power for moving hydraulic stand W back and forth is transmitted by shaft 95 from transmission Y to hydraulic stand chain 82. It is to be understood that only one set of chains 91, 92 transmit power at a time. One set supplies a rearward movement equal to the travel speed of the cars, while the other set operates at a much more rapid forward speed to return hydraulic stands W to their forward position as shown in FIGURE 16.

Referring now to the structure relating to the vertical movement of the bar depressing apparatus G, it will be observed that hydraulic stands W contain vertical slides 96 having V-shaped edges 96ᵃ slidably mounted between V-grooved rollers 97. A structural member in the nature of a tube 98 of substantial diameter, capable of supporting weight of considerable magnitude connects the two slides 96. Also joining said slides 96 is a U-beam 99 mounted above tube 98.

Supporting the blade assemblies, which will later be described in detail, are blade support bars 100, most clearly illustrated in FIG. 19. Several of said support bars are fastened to the underside of tube 98 and reinforced to U-beam 99 by brace members 101. Curved channel braces 102 lead from the top of vertical slides 96 to the U-beam 99, said curved braces being further reinforced by channels 103 attached to brace members 101.

It will now be evident from the foregoing description that the vertical slides 96 being connected by tube 98 and reinforced by the various beams and channels described will move in a vertical direction between rollers 97 as one solid unitary assembly.

Suspended from the support bars 100 are three blade assemblies (FIGS. 19 and 22), each comprised of a mountnig block 104 supporting an attachment plate 105 to which a pusher blade 106 is bolted. Said blades arranged in progressively increasing length are provided with vertical slots 107 and adjusting screws 108 for changing the position of the blades relative to support 100. Attached to each blade 106 are at least two electrical vibrating motors 109 of the eccentric load type whose purpose will later be described.

As will now be apparent, the stand W and the vertical slide 96 constitute a carriage for the bar pusher blades 106.

The power for raising and lowering the entire bar depressing assembly consisting of blades 106, tube 98, vertical slides 96, and all their structural reinforcing members previously described, is obtained from hydraulic cylinders 110 which are attached to the hydraulic stands W through channel braces 111. The ram shafts 112 of said hydraulic cylinders are attached to the U-beam 99 of the bar depressing assembly and, therefore, it will be seen that any vertical movement of hydraulic ram shaft 112 will cause the entire bar depressing assembly to move up or down.

A separate positive means has been provided for coordinating the horizontal movement between both hydraulic stands W and the vertical movement between both slides 96.

The two hydraulic stands W are connected by a shaft 113, each end of which is journalled in bracket arms 114 attached to the forward vertical channels 76. Mounted upon each end of said shaft is a pinion gear 115 which engages rack 116, mounted upon the frame of the car. Also attached to said bracket arms is a reinforcing channel member 118. This positive means of interconnecting the hydraulic stands W will prevent binding and maintain alignment between the two hydraulic stands. More rigidity between these stands is obtained from channel beams 117 which extend the width of the car and connect the front and rear of each hydraulic stand together.

To correct for any unequal pressure between hydraulic cylinders 110 and to insure equal vertical movement for each end of the bar depressing assembly, a shaft 119 connecting the two vertical slides 96 is provided with pinion gears 120 which engage racks 121 mounted on the hydraulic stands W.

After the longitudinal bars L are payed out by car C on top of the previously laid transverse bars T, the bar depressing assembly on car D begins its operation.

When car D first approaches the ends of a newly laid set of bars L, the bar depressing assembly will appear as in FIGURE 16 where the hydraulic stand W is all the way forward and the pusher blades 106 are in their uppermost position. As soon as the bars L pass under said pusher blades the hydraulic stand and pusher blades begin to move rearward and at the same time the bar depressing assembly is slowly forced downward by hydraulic cylinders 110 with the result that the pusher blades 106 force the bars L, and the transverse bars T under them, to a predetermined depth in the previously poured soft concrete. To assist in forcing the bars into the concrete, the blades 106 are equipped with the previously referred to vibrating motors 109.

The bar depressing assembly travels to the rear of car D at the same rate of speed as the forward travel of the car, so that the blades 106 will not drag through the soft concrete or dislocate the bars. Upon reaching the rearmost limit of their travel (FIG. 17) the blades are quickly withdrawn from the concrete by hydraulic cylinder 110 and the hydraulic stands W return to the front of the car (FIG. 16) to repeat the cycle. This forward movement occurs at a rate of speed greater than the forward speed of the cars so that very little distance is lost between each cycle.

The transverse and longitudinal bars as well as the pusher blades will all disturb the surface of the newly poured concrete, therefore, the trailing end of car D is equipped with a surface vibrator H (FIG. 1) of the type commonly used in the concrete roadbuilding field, Hand cranks 122 allow for height adjustment of said vibrator. Said vibrator compacts the soft concrete into a smooth-surfaced uniform mass.

FIGURES 16 and 17 further illustrate a fluid reservoir R for supplying the hydraulic systems employed on cars C and D. Also carried on the top deck of car D is a gasoline electric power unit P for supplying the necessary power for operating the pusher blade, vibrators, and for general lighting and control systems.

Occasionally it is not necessary to include transverse bars in reinforcing a roadbed. In such a case, it is not necessary to make any adjustment with this invention as the transverse bars are merely omitted from car A without affecting the operation of the longitudinal bar laying operation.

To clear the top surfaces of rails R of any concrete or other debris, scrapers Z are mounted in front of wheels 2 of car A.

We claim:

1. An apparatus for laying reinforcing bars in soft concrete poured on the sub-grade between forms which concurrently define a roadway and constitute rails upon which traction wheels of the apparatus travel, said apparatus including, a longitudinal bar laying station including opposite side supports for receiving the longitudinal bars from a transport facility, a series of spaced longitudinal bar roll stands disposed between the said side supports, said stands each including a plurality of vertical slots, rollers in the slots of all of said bar stands disposed at predetermined progressively decreasing lower levels from the front of said station to the rear thereof, latch means under common manual control for each of the slots of said bar stands and adapted initially to support the longitudinal bars and drop them in the slots onto the rollers by said manual control, a forwardly and downwardly inclined shield against which the lowermost ends of the longitudinal bars slide when they are released by the latch means, a fixed power driven pinch roller in surface alinement with the rollers of the stand adjacent the rear of said station, lever means having a bar stop gate for arresting the gravitation of the longitudinal bars on the rollers of said roll stands, a pinch roller on the forward end of said lever means for cooperation with said fixed pinch roller to grip the bars when the lever is rocked to lift the stop gate, and means for operating the pinch rolls when the gate is elevated to pay out the longitudinal bars onto the roadway.

2. A mobile apparatus for laying reinforcing bars in soft concrete poured on the sub-grade between side forms which concurrently define a roadway and constitute the rails upon which a series of traction wheels of the apparatus travel, said apparatus including, leading transverse bar depositing means at one end of the apparatus for laying individual bars in spaced relationship transversely of the roadway, longitudinally disposed bar depositing means disposed substantially medially of the apparatus for depositing longitudinal bars upon the previously deposited transverse bars, pusher means for pushing the crossed transverse and longitudinal bars into the soft concrete, said pushing means comprising a shiftable carriage, sprocket wheels mounted on said pusher means, track means for mounting said carriage for back and forth movement in a direction longitudinally of the apparatus, means vertically reciprocatable on said carriage and having pusher blades at its lower end, chain means having opposite ends connected to opposite ends of the carriage, said chain means having the medial reaches thereof sheaved over said sprocket wheels, means for driving one of said sprocket wheels, said driving means comprising a two-speed, two-direction transmission for transmitting a slow rearward motion to the carriage and a forward movement faster than the rearward movement, power means on the carriage for actuating the pusher blades downwardly as the carriage moves to the rear, said power means also being reversible to lift the blades when the carriage reaches the end of its rearward stroke, and other power means having flexible driving connections with at least a pair of traction wheels of the apparatus to propel the apparatus forward to advance the pusher means along the previously deposited crossed transverse and longitudinal bars.

3. A mobile apparatus for laying reinforcing bars in soft concrete poured on the sub-grade between side forms which concurrently define a roadway and constitute rails upon which a series of traction wheels of the frame of the apparatus travels, said apparatus including a leading transverse bar depositing station at one end of the apparatus having means for laying bars transversely of the roadway, a longitudinally disposed bar depositing station having means for laying longitudinal bars, said longitudinally disposed station disposed substantially medially of the apparatus, a crossed bar depressing station located to the rear of the longitudinal bar depositing station, said depressing station including horizontal track means, a carriage including hydraulic stand means having rollers for traversing said track means during backward and forward movement of said carriage, vertical slides mounted in said stand means, depending pusher blades suspended between said slides, said blades being spaced longitudinally of the stand means and having their lower edges disposed at progressively lower levels towards the rear of the apparatus to engage the longitudinal bars where they cross the transverse bars to push the crossed bars into the soft concrete, and power means on the crossed bar depressing station propelling the apparatus, and means on said stations synchronous with the forward movement of the apparatus simultaneously actuating said means depositing the transverse and longitudinal bars in crossed relation and the vertical slides for depressing the crossed bars into the soft concrete.

4. An apparatus according to claim 3, wherein the carriage is provided with gears meshing with horizontal racks on the frame to hold the carriage against skewing during its movement.

5. An apparatus according to claim 3, wherein the vertical slides have gears meshing with vertical racks on the carriage to insure that the slides will not twist in their movement.

6. An apparatus according to claim 3, wherein, the blades are provided with vibrating means to aid the entry of the blades into the concrete.

7. An apparatus for continuously laying separate transverse and longitudinal reinforcing bars progressively in soft concrete poured on the sub-grade between side forms which concurrently define a roadway and constitute rails upon which wheels of the apparatus travel, said apparatus including, in combination, means controlled by the movement of the apparatus on the rails for depositing individual transverse bars in spaced relation on the top of the soft concrete, means also controlled by the movement of the apparatus for laying a plurality of separate longitudinal bars onto the previously deposited transverse bars, means further controlled by the movement of the apparatus for depressing the crossing transverse and longitudinally arranged bars into the soft concrete during forward movement of the apparatus; power means for propelling the apparatus; power transmitting means for synchronizing the actuation of said means for depositing the transverse bars, the longitudinal bars, and depressing the crossed bars with the forward traveling movement of the apparatus; and trailing means for tamping the surface of the concrete to erase the scars caused by the bars being pushed into the soft concrete and to increase the density thereof.

8. An apparatus for continuously laying separate transverse and longitudinal reinforcing bars progressively in soft concrete poured on the sub-grade between side forms which concurrently define a roadway and constitute rails upon which traction wheels of the apparatus travel, said apparatus including, in combination, a leading transverse bar depositing station at one end of the apparatus for depositing individual bars in spaced relation transversely of the roadway, a medially disposed longitudinal bar depositing station for laying a plurality of separate longitudinal bars onto the top of the previously deposited transverse bars, a rearwardly disposed crossed bar depressing station located behind the longitudinal bar depositing station, power means on the apparatus for propelling the same, and power transmitting means for synchronously effecting with the forward traveling movement of the apparatus the simultaneous operation of said leading, medially, and rearwardly disposed stations to deposit the transverse and longiutdinal bars in crossed relation and depress the crossed bars into the soft concrete.

9. An apparatus according to claim 8, wherein the said transverse bar depositing station includes a storage tray for holding a supply of said bars, upright guide means extending downwardly from said tray for receiving said bars one at a time from said storage tray, metering wheel means at the lower ends of said guide means and having peripheral notches for receiving individual bars from said guide means and depositing them on the soft concrete, and said power transmitting means on said lead station comprising sprocket and gear means connecting said metering means with a wheel of the apparatus for controlling the dropping of the transverse bars in a predetermined spaced relation as the apparatus moves forward.

10. An apparatus according to claim 8, wherein the said transverse bar depositing station includes a storage tray for holding a supply of said bars, upright guide means extending downwardly from said tray for receiving said bars one at a time from said storage tray, and metering wheel means at the lower ends of said guide means, said metering wheel means comprising a pair of angularly adjustable discs each having peripheral notches adapted for registry to receive bars of maximum diameter and when turned out of registry to receive bars of lesser diameter.

11. An apparatus according to claim 8, wherein the said transverse bar depositing station includes a storage tray for holding a supply of said bars, upright guide means extending downwardly from said tray for receiving said bars, and metering wheel means at the lower ends of said guide means having peripheral notches for receiving individual bars from the guide means and depositing them on the soft concrete, and alterable means to change the ratio of the rotation of the metering wheel with respect to its related traction wheel to effect selective spacing of the transverse rods on the soft concrete, said alterable means comprising changeable sprockets and gears for the metering wheel and its related traction wheel.

12. In an apparatus for laying reinforcing bars in soft concrete poured on the sub-grade between forms which concurrently define a roadway and constitute rails upon which the traction wheels of the apparatus travel, said apparatus including, a longitudinal bar laying station including a plurality of upright guide means for receiving a plurality of individual longitudinal bars, means for releasably supporting said longitudinal bars at the upper ends of said guide means, means for actuating said releasable bar supporting means to drop said bars by gravity within said guide means, a plurality of rollers disposed in said guide means at progressively lowered positions from one end of the apparatus to the other end to support said bars when dropped within said guide means, a stop gate adjacent the lowermost of said rollers for engaging the ends of said bars, a fixed power driven pinch roll upon which the rear ends of the bars rest as they engage the stop gate, a movable pinch roll pivotally supported to press the bars against the fixed pinch roll when the stop gate is elevated to permit the bars to be payed out on the roadway.

13. An apparatus for laying reinforcing bars in soft concrete poured on the sub-grade between forms which concurrently define a roadway and constitute rails upon which the traction wheels of the apparatus travel, said apparatus including a longitudinal bar laying station including a plurality of upright guide means for receiving a plurality of individual longitudinal bars, means for releasably supporting said longitudinal bars at the upper ends of said guide means, roller supporting means carried by said upright guide means and including a plurality of rollers disposed at progressively lowered positions from one end of the station to the other end thereof, means for actuating said releasable supporting means to drop said bars onto said roller supporting means, a fixed power driven pinch roller for receiving the lowermost ends of said bars from said roller means, rockable lever means supported adjacent the power driven pinch roller, a bar stop gate adjustably connected with said lever means to provide for stopping the ends of the bars at different distances in relation to the axis of the fixed pinch roller to determine the degree of overlap between subsequently payed out bars, a movable pinch roller carried by the forward end of said lever means for pressing the bars against the power driven fixed roller when the stop gate is elevated to pay out the longitudinal bars onto the roadway.

14. An apparatus according to claim 13, wherein the bar laying station includes a plurality of longitudinally spaced rows of bar stands, said stands each including upright guide means forming vertical slots having flared mouth portions, bar supporting latch means on some of said rows of bar stands to support the longitudinal bars at the upper ends of said bar stands, bar means connecting all of said latch means to move together to and from a longitudinal bar supporting position, rollers disposed across the slots of said upright guide means at progressively lower elevations from one end of the station to the other end thereof to provide paths over which the bars may gravitate to the end of the apparatus station adjacent the lowermost of said rollers, and a common manual operator for said bar connecting means to actuate said latch means to drop said longitudinal bars upon said rollers.

15. An apparatus according to claim 13, wherein the rockable lever means includes an hydraulically operated lever having a plurality of longitudinally disposed rows of openings, and the bar stop gate may be selectively fitted in said openings at different distances from the axis of the fixed pinch roller.

16. An apparatus for laying reinforcing bars in soft concrete poured on the sub-grade between forms which concurrently define a roadway and constitute rails upon which the traction wheels of the apparatus travel, said apparatus including a longitudinal bar laying station including, means for releasably supporting a plurality of individual straight parallel longitudinal bars in spaced horizontal arrangement, means for releasing said bars in unison to drop by gravity, means for temporarily arresting the bars in their downward movement in an inclined position, and power means for engaging the bars to progressively pay them out of the bar laying station onto the roadway at a rate of speed equal to the speed of the forward travel of the apparatus.

References Cited in the file of this patent
UNITED STATES PATENTS

| | | |
|---|---|---|
| 1,996,153 | Heltzel | Apr. 2, 1935 |
| 2,295,947 | Heltzel | Sept. 15, 1942 |
| 2,596,206 | Carnes | May 13, 1952 |
| 2,613,861 | Goerlitz | Oct. 14, 1952 |
| 2,950,659 | Smiley | Aug. 30, 1960 |